United States Patent
Porterfield

(12) 
(10) Patent No.: US 6,651,122 B2
(45) Date of Patent: Nov. 18, 2003

(54) METHOD OF DETECTING A SOURCE STROBE EVENT USING CHANGE DETECTION

(75) Inventor: A. Kent Porterfield, New Brighton, MN (US)

(73) Assignee: Micron Technology, Inc., Boise, ID (US)

( * ) Notice: Subject to any disclaimer, the term of this patent is extended or adjusted under 35 U.S.C. 154(b) by 347 days.

(21) Appl. No.: 09/730,775

(22) Filed: Dec. 7, 2000

(65) Prior Publication Data

US 2002/0138681 A1 Sep. 26, 2002

(51) Int. Cl.$^7$ ................................................ G06F 13/00
(52) U.S. Cl. ........................ 710/100; 713/400; 713/503; 713/600
(58) Field of Search ................................. 710/100, 105, 710/305; 711/100, 104, 105; 713/400, 500, 503, 600

(56) References Cited

U.S. PATENT DOCUMENTS

| | | | | |
|---|---|---|---|---|
| 4,748,588 A | * | 5/1988 | Norman et al. ............. | 713/400 |
| 5,272,729 A | * | 12/1993 | Bechade et al. ............. | 375/371 |
| 5,448,591 A | * | 9/1995 | Goodrich .................... | 375/257 |
| 5,796,960 A | | 8/1998 | Bicevskis et al. | |
| 5,919,254 A | * | 7/1999 | Pawlowski et al. ......... | 710/104 |
| 5,991,833 A | | 11/1999 | Wandler et al. | |
| 6,016,066 A | * | 1/2000 | Ilkbahar ..................... | 327/23 |
| 6,029,223 A | | 2/2000 | Klein | |
| 6,047,349 A | | 4/2000 | Klein | |
| 6,070,215 A | | 5/2000 | Deschepper et al. | |
| 6,073,186 A | * | 6/2000 | Murray et al. ................ | 710/11 |
| 6,092,219 A | | 7/2000 | Porterfield | |
| 6,094,700 A | | 7/2000 | Deschepper et al. | |
| 6,430,697 B1 | * | 8/2002 | Muljono ..................... | 713/600 |
| 6,463,092 B1 | * | 10/2002 | Kim et al. ................... | 375/219 |
| 6,513,091 B1 | * | 1/2003 | Blackmon et al. .......... | 710/316 |
| 6,522,599 B2 | * | 2/2003 | Ooishi et al. ................ | 365/233 |
| 6,529,993 B1 | * | 3/2003 | Rogers et al. .............. | 711/105 |
| 6,530,047 B1 | * | 3/2003 | Edwards et al. ............ | 714/724 |
| 2002/0112119 A1 | | 8/2002 | Halbert et al. | |

* cited by examiner

Primary Examiner—Xuan M. Thai
(74) Attorney, Agent, or Firm—Dickstein Shapiro Morin & Oshinsky LLP

(57) ABSTRACT

A hub based computer system having a central hub that communicates with a plurality of satellite devices over respective link buses. Each link bus is substantially the same and adheres to a predefined link bus protocol. The link bus protocol establishes a method in which data receiving circuitry of a target device can be put into a known state during a final stage of a source strobe event such as e.g., a data transfer. Once in the known state, the source strobes are stopped on the link bus. The target device uses internal logic clocked by a system clock rather than the source strobe to continuously sample the state of the receiving circuitry to see if the state has deviated from the known state. A change detect circuit determines if the receiving circuitry has deviated from the known state and if so, detects a new source strobe event. The change detect circuit detects the new event in the less stringent clock domain, which allows greater control of the skew and asymmetry of the source strobe. This allows the system to achieve substantially higher data transfer rates than conventional source strobe systems.

62 Claims, 11 Drawing Sheets

METHOD OF DETECTING A SOURCE STROBE EVENT USING CHANGE DETECTION

FIELD OF THE INVENTION

The invention relates to computer systems, and more particularly to a method of using change detection to detect a source strobe event on a source strobed computer system bus.

BACKGROUND OF THE INVENTION

Several of today's computer system architectures employ a source strobed bus and method to transfer data between devices. In a typical source strobe architecture, the transmitting device transmits to the receiving device a clock signal/strobe and data. The strobe alerts the receiving device that valid data has been transmitted over the bus. This is typically referred to as a source strobe or "clock forwarding" event. Computer bus architectures such as AGP (accelerated graphics port), DDR SDRAM (double data rate synchronous dynamic random access memory), and RDRAM (Rambus random access memory) utilize source strobes in this manner.

Source strobe techniques allow data to be transmitted at higher speeds because the flight time and distribution delays of the clock signal and the data are matched. Often times, data is transferred on both rising and falling edges of the strobe. Source strobe techniques, however, require extraordinary care in matching the delays of the data and source clock signals, as well as minimizing the asymmetry of the source strobe itself (i.e., the differences in delays between the rising and falling edges of the strobe). In a typical source strobed bus, both rising and falling edges of the strobe are used to clock data., but there is a difference in the rising and falling edge delays caused by intrinsic (delay through a component) and extrinsic (delay caused by loading on the component output) delays of the system.

The intrinsic delay can typically be minimized, but the extrinsic delay is a factor of how many loads are being driven and the wire lengths of the loads. The extrinsic delay is basically a non-linear RC (resistance times capacitance) curve making the extrinsic delay a "wild card" in attempting to balance the delays. The on-die wire lengths must be managed and the number of loads must be equalized to minimize the asymmetry of the strobes. This can be illustrated with the following example. Let a strobe pulse have a period of 5 nano-seconds (nsecs). In a perfect system, the 5 nsec period would yield a pulse with a 2.5 nsec high and a 2.5 nsec low. Unfortunately, the intrinsic delays are different when driving from a high to a low, than they are when driving from a low to a high. The extrinsic delays are also different. Consequently, the ideal 5 nsec pulse may actually be 3 nsec high and 2 nsec low. The time lost due to this asymmetry cuts into the extremely tight timing specifications of the source strobed bus and thus, must be minimized.

Typically, the core logic of the receiving device does not interface directly with the source strobed bus. Often times, the logic necessary to capture data from the bus is carefully placed in what is commonly referred to as an I/O (input/output) or data macro. The I/O macro is replicated many times along the edge of the die of the receiving device's integrated circuit (IC). Special care is taken to distribute the source strobe to each of the I/O macros in a manner that substantially guarantees a minimum skew and asymmetry of the source clock strobe so that the strobe may be aligned within a specific data eye of the transmitted data. Typically, once the data has been captured in the I/O macros, the data is transferred into another clock domain by moving the data to the core logic of the receiving devices. The core logic clock domain has substantially less stringent timing requirements than the source strobe clock domain because the core logic clock typically operates at a slower rate than the source strobe clock.

Some of today's source strobed bus architectures such as e.g., DDR and RDRAM use a bus protocol in which each device connected to the bus agrees on when a strobe event occurs and how many events will occur. The information concerning the timing and number of events are passed between the devices through signals separate from the tightly controlled source strobed data path. In other architectures such as e.g., AGP, some source strobe events are isochronous in nature (i.e., the event may occur at unknown times). These architectures must rely on one or more flip-flops that toggle with each strobe event. The flip-flops are sampled within the less stringent clock domain to see if a strobe event occurred. Both of these architectures and protocols, however, experience the following problems that adversely impact the skew and asymmetry of the source strobes.

When distributed internal to an IC, the strobe delays must closely match the data delays. The strobe is distributed to capture data in flips-flops within the I/O macros. When the strobes are used outside the data path to toggle other non-data related flip-flops, the IC must be designed to either: (1) maintain the uniformity of the I/O macros by including toggle flip-flops in each macro; or (2) place toggle flip-flops are outside the tightly controlled I/O macro. The first choice adds substantially more load to every strobe and thus, adversely impacts the strobe delay and asymmetry. The second choice forces the IC designer to use the strobe clock outside the well controlled I/O macros in order to toggle a single flip-flop. This induces large uncontrolled wire delays on the strobe distribution, which cuts into the budget allotted for skew and asymmetry.

Thus, there is a desire and need for a technique to detect a source strobe event in the less stringent clock domain in a manner that will not adversely impact the skew and asymmetry of the internally distributed source strobe.

SUMMARY OF THE INVENTION

The invention provides a technique to detect a source strobe event in a clock domain that is less stringent than the source strobe domain and in a manner that will not adversely impact the skew and asymmetry of the internally distributed source strobe.

The above and other features and advantages are achieved by a hub based computer system having a central hub that communicates with a plurality of satellite devices over respective link buses. Each link bus is substantially the same and adheres to a predefined link bus protocol. The link bus protocol establishes a method in which data receiving circuitry of a target device can be put into a known state during a final stage of a source strobe event such as e.g., a data transfer. Once in the known state, the source strobes are stopped on the link bus. The target device uses internal logic clocked by a system clock rather than the source strobe to continuously sample the state of the receiving circuitry to see if the state has deviated from the known state. A change detect circuit determines if the receiving circuitry has deviated from the known state and if so, detects a new source strobe event. The change detect circuit detects the new event without increasing the load on the source strobe, without routing the strobe outside of the receiving circuitry and in the less stringent clock domain, which allows greater control of the skew and asymmetry of the source strobe. This allows the system to achieve substantially higher data transfer rates than conventional source strobe systems.

BRIEF DESCRIPTION OF THE DRAWINGS

The above and other advantages and features of the invention will be more clearly understood from the following detailed description of the invention, which is provided in connection with the accompanying drawings in which.

DETAILED DESCRIPTION OF THE PREFERRED EMBODIMENTS

Figure 1:
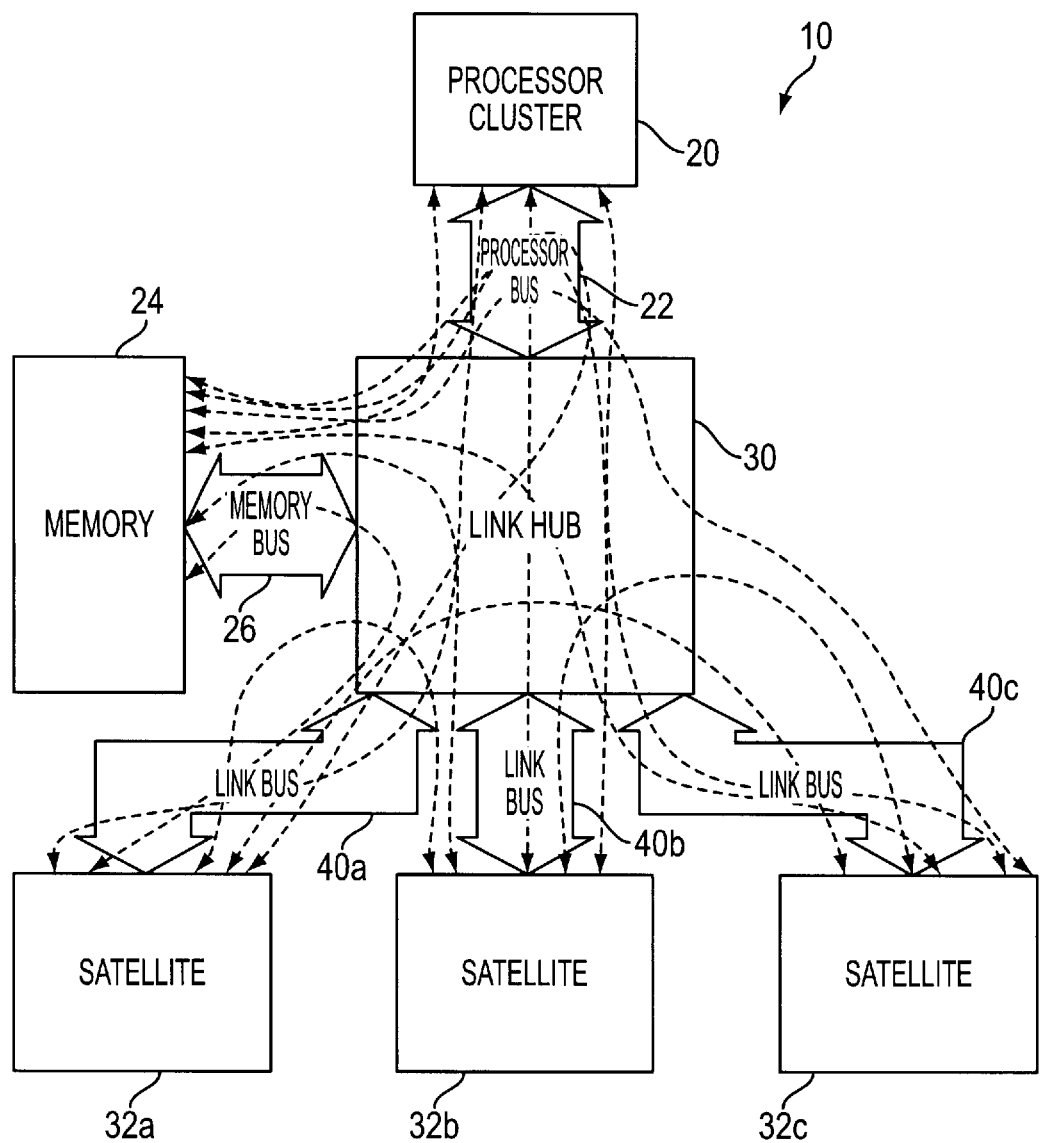
FIG. 1 is a hub based computer system constructed in accordance with an exemplary embodiment of the invention.

FIG. 1 is a hub based computer system 10 utilizing link buses 40a, 40b, 40c (collectively referred to herein as "link buses 40") in accordance with an exemplary embodiment of the invention. The system 10 includes a processor cluster 20, a memory device 24, a link hub 30 and a plurality of satellite devices 32a, 32b, 32c (collectively referred to herein as "satellite devices 32"). The processor cluster 20 may contain one or many processor units. Although not required to practice the invention, if more than one processing unit is contained within the cluster 20, they are preferably identical to each other. The satellite devices 32 can be bridges or hubs to industry standard buses, such as e.g., PCI, PCI-X and AGP, or the devices 32 can be other components typically found in a computer system. The devices 32 can be connected to one or more I/O devices if so desired.

The link hub 30 is connected to the processor cluster 20 by a dedicated processor bus 22. The link hub 30 is connected to the memory device 24 by a dedicated memory bus 26. It is desirable to used dedicated processor and memory buses 22, 26 to minimize any latencies on transfers to/from the processor cluster 20 and to/from the memory device 24. The link hub 30 is connected to each satellite device 32a, 32b, 32c by a link bus 40a, 40b, 40c (collectively referred to herein as "link buses 40"). Each link bus 40a, 40b, 40c is substantially the same. In an exemplary embodiment, the link bus 40 is a source strobed bus. As will be described below in more detail, each link bus 40a, 40b, 40c adheres to a predefined link bus protocol, which makes the interface between the link hub 30 and the devices 32 generic. With these connections to the link hub 30, every component in the system can communicate with each other through the hub 30. Possible communication paths between the system components are represented by the dashed-lines on FIG. 1.

As will become apparent, the use of the link buses 40 and link bus protocol allows source strobe events to be detected in a clock domain that is less stringent than the source strobe domain of the link bus 40. By detecting source strobe events in this manner, the system of the invention can substantially control and minimize any skew and asymmetry of the source strobed link bus 40, which allows for higher data rates and also improves the overall performance of the system 10.

It is desirable that the system 10 be a high performance, I/O intensive computer system. For example, the system 10 may be a server computer system or a computer workstation. It should be apparent that the invention is not limited to a particular type of environment/system or to particular devices 32 used in the system 10. All that is required to practice the invention is to provide a link bus 40 between the link hub 30 and the satellite devices 32 that must communicate with other satellite devices 32, processor cluster 20 or memory device 24. In addition, each satellite device and the link hub 30 must adhere to the link bus protocol.

A brief description of the link bus 40 is now provided. A more detailed description of the link bus 40, as well as the link bus protocol, will be provided below with respect to FIGS. 6–9. Briefly, the link bus 40 is a low pin count, high bandwidth bus that is used to transfer data and exchange messages between the components in the system 10. In a preferred embodiment, the link bus 40 consists of eight or sixteen command/address/data lines, two source strobe clock signal lines and a status signal line. Communications over the link bus 40 adhere to a link bus protocol that is described below in more detail.

The link bus 40 is scaleable, and configurable to support high bandwidths such as e.g., 1 giga-byte per second (GB/s) and 500 mega-bytes per second (MB/s). The link bus 40 preferably uses a quad pumping technique that transfers command, address and data information four times per clock period. That is, in a preferred embodiment, the link bus 40 is a quad pumped bus. It should be noted that the link bus 40 could use double pumping (i.e., transfers information two times per clock period) or a single pumping techniques if so desired. Thus, the invention is not limited to a link bus 40 that is a quad pumped bus.

Figure 2:
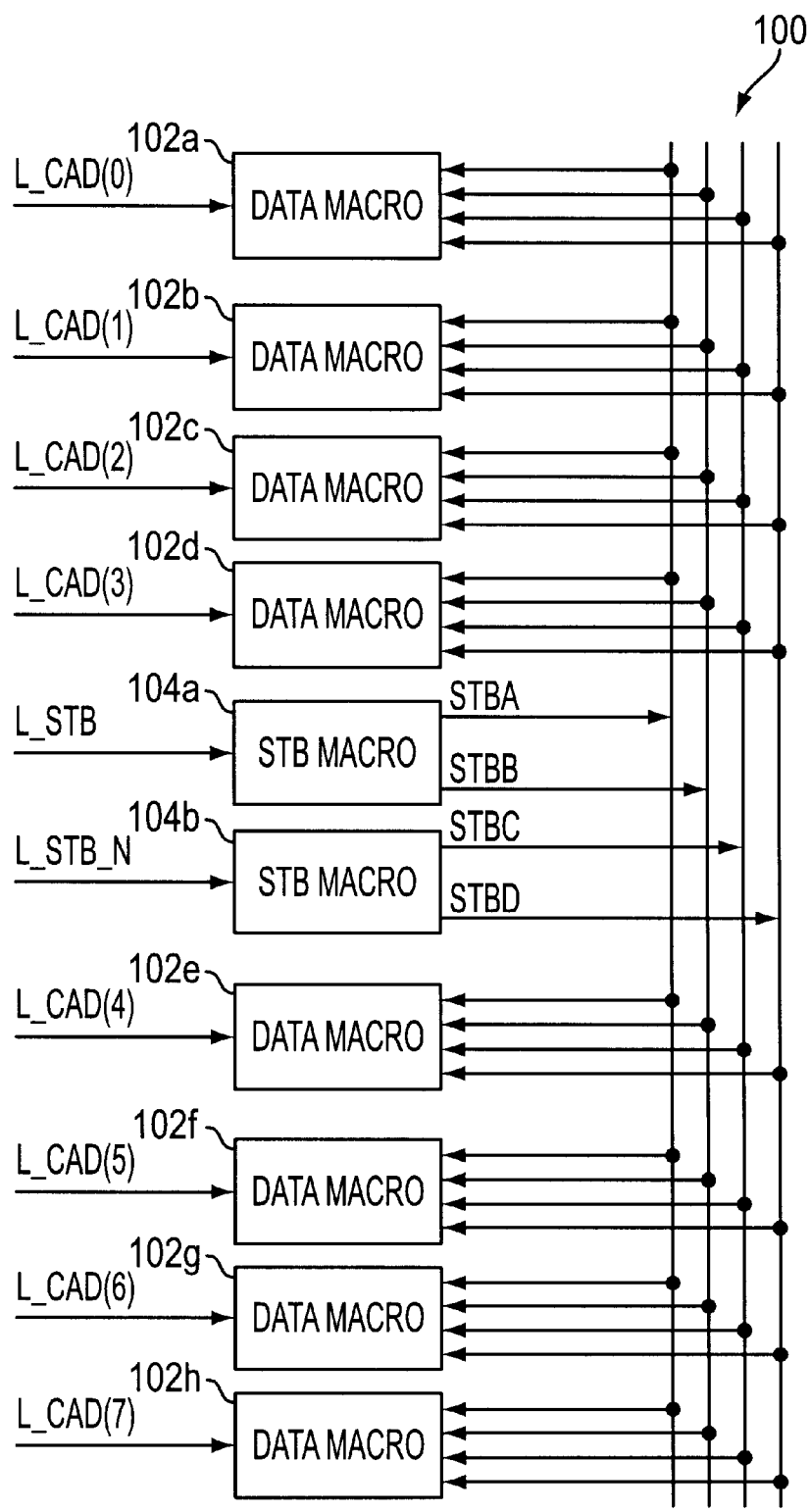
FIG. 2 is exemplary receiving circuitry used in the system illustrated in FIG. 1.

FIG. 2 illustrates exemplary receiving circuitry 100 used by the devices connected to the link bus (e.g., link hub and satellite device). The receiving circuitry 100 of the illustrated embodiment includes eight receive data macros 102a, 102b, 102c, 102d, 102e, 102f, 102g, 102h (collectively referred to herein as "receive data macros 102") and two strobe macros 104a, 104b (collectively referred to herein as "strobe macros 104"). In an exemplary embodiment, the receiving circuitry 100 is located along an edge of the link bus device's integrated circuit.

The first strobe macro 104a is connected to receive a first source strobe clock signal L_STB and the second strobe macro 104b is connected to receive a second source strobe clock signal L_STB_N. The second source strobe clock signal L_STB_N is the complement of the first source strobe clock signal L_STB. The strobes L_STB, L_STB_N are used to signify the arrival of data on the command/address/data bus portion of the link bus and are described in more detail below.

The strobe macros 104 generate additional strobes STBA, STBB, STBC, STBD, which are input into the receive data macros 102. The additional strobes STBA, STBB, STBC, STBD are used by the receive data macros 102a, 102b, 102c, 102d, 102e, 102f, 102g, 102h to respectively clock in the eight command/address/data bits L_CAD(0), L_CAD(1), L_CAD(2), L_CAD(3), L_CAD(4), L_CAD(5), L_CAD(6), L_CAD(7) (collectively referred to herein as "command/address/data bits L_CAD(i)") of an L_CAD data packet transferred on the link bus. It should be appreciated that FIG. 2 represents an 8-bit link bus and that if a 16-bit or larger link bus were illustrated there would be at least 16 receive data macros 102, with each macro 102 inputting a respective bit of the L_CAD packet.

Figure 3:
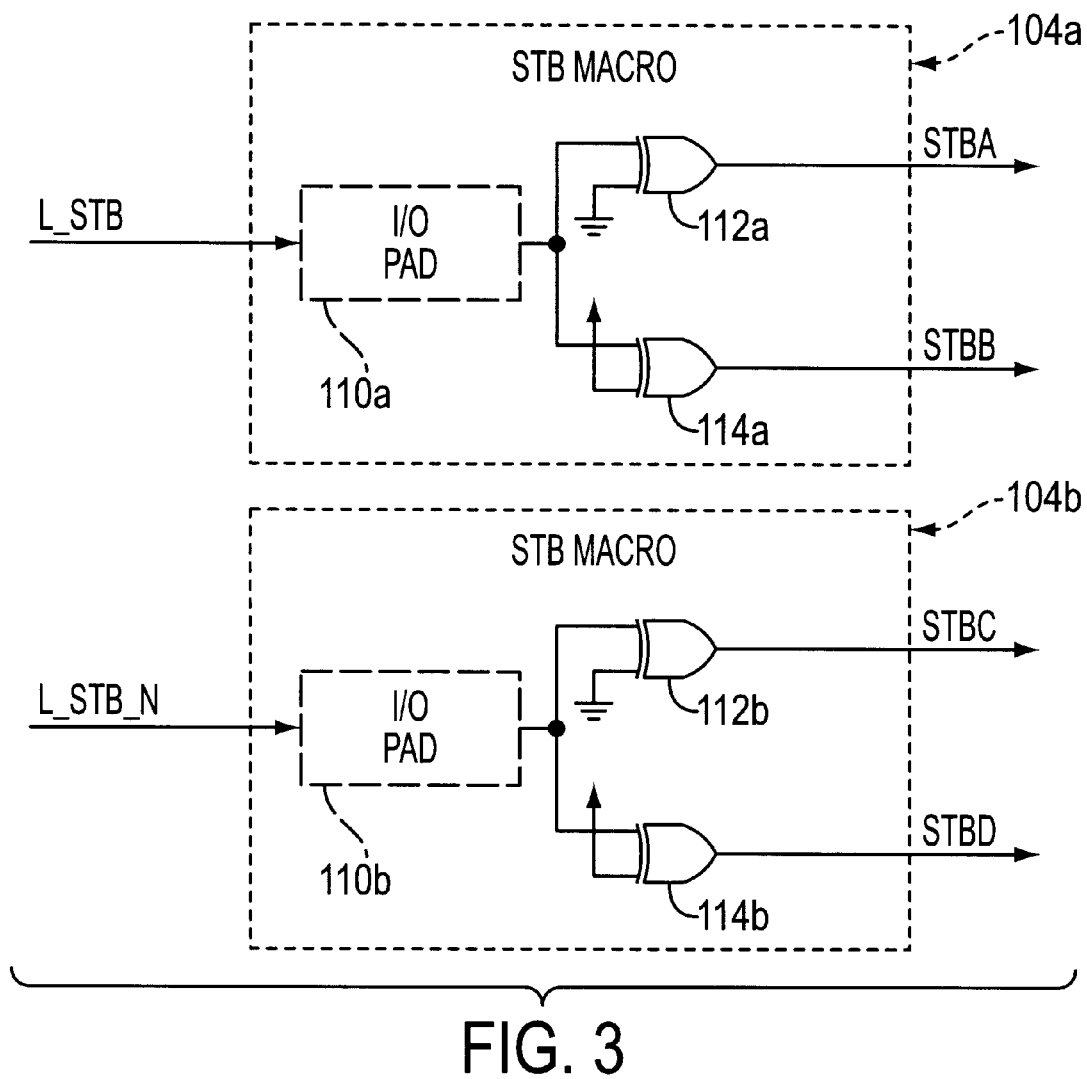
FIG. 3 is an exemplary strobe macro used in the circuitry illustrated in FIG. 2.

FIG. 3 illustrates exemplary strobe macros 104a, 104b used in the circuitry 100 illustrated in FIG. 2. The first strobe macro 104a includes an I/O pad 110a and two exclusive OR (XOR) gates 112a, 114a. The I/O pad 110a is connected to receive the first strobe clock signal L_STB from the link bus. The I/O pad 110a is connected to an input terminal of the first and second XOR gates 112a, 114a such that the first strobe clock signal L_STB is input into the XOR gates 112a, 114a. The second input terminal of the first XOR gate 112a is connected to a ground potential while the second input terminal of the second XOR gate 114a is connected to a potential greater than the ground potential (e.g., Vcc).

With this configuration the strobe macro 104a is capable of generating the two strobes STBA and STBB from the single strobe input L_STB. The second additional strobe STBB will be essentially the complement of the first additional strobe STBA. For example, when the link bus strobe L_STB is high, the first XOR gate 112a generates a high first additional strobe STBA and the second XOR gate 114a generates a low second additional strobe STBB. Similarly, when the link bus strobe L_STB is low, the first XOR gate 112a generates a low first additional strobe STBA and the second XOR gate 114a generates a high second additional strobe STBB.

The second strobe macro 104b includes a second I/O pad 110b and two XOR gates 112b, 114b. The second I/O pad 110b is connected to receive the second strobe clock signal L_STB_N from the link bus. The second I/O pad 110b is connected to an input terminal of the third and fourth XOR gates 112b, 114b such that the second strobe clock signal L_STB_N is input into the XOR gates 112b, 114b. The second input terminal of the third XOR gate 112b is connected to a ground potential while the second input terminal of the fourth XOR gate 114b is connected to a potential greater than the ground potential (e.g., Vcc).

With this configuration the strobe macro 104b is capable of generating the two strobes STBC and STBD from the single strobe input L_STB_N. The fourth additional strobe STBD will be essentially the complement of the third additional strobe STBC. For example, when the link bus strobe L_STB_N is high, the third XOR gate 112b generates a high third additional strobe STBC and the fourth XOR gate 114b generates a low fourth additional strobe STBD. Similarly, when the link bus strobe L_STB_N is low, the third XOR gate 112b generates a low third additional strobe STBC and the fourth XOR gate 114b generates a high fourth additional strobe STBD. As noted earlier, the four additional strobes STBA, STBB, STBC, STBD are used by the receive data macros to input the command/address/data bits L_CAD(i) from the link bus.

Figure 4:
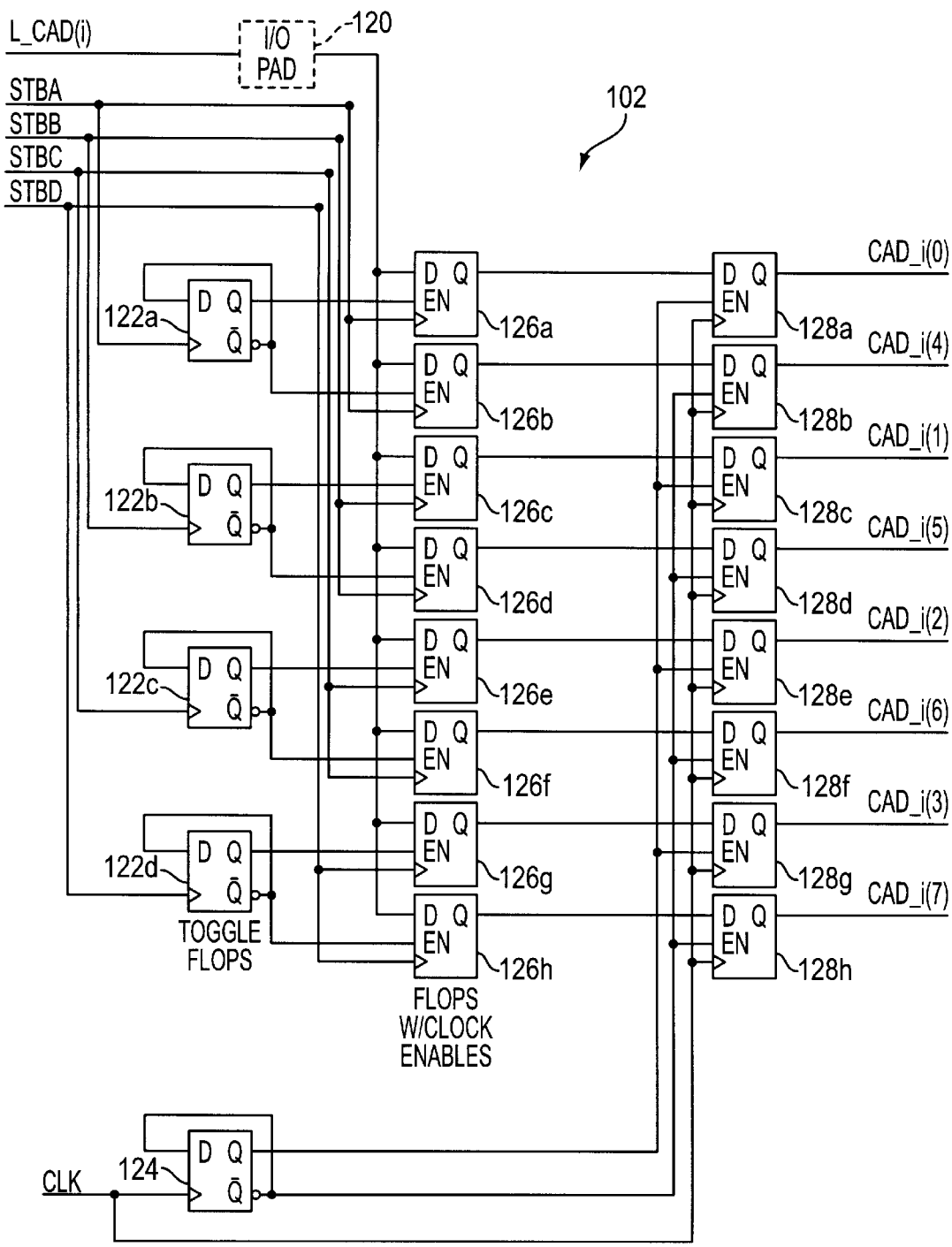
FIG. 4 is an exemplary receive data macro used in the circuitry illustrated in FIG. 2.

FIG. 4 is an exemplary receive data macro 102 used in the receiving circuitry 100 illustrated in FIG. 2. The macro 102 includes an I/O pad 120 connected to receive a command/address/data packet L_CAD(i) from the link bus 40 (FIG. 1). The macro 102 also includes four toggle flip-flops 122a, 122b, 122c, 122d (collectively referred to herein as "toggle flops 122"), eight strobe domain flip-flops 126a, 126b, 126c, 126d, 126e, 126f, 126g, 126h (collectively referred to herein as "strobe domain flops 126"), eight clock domain flip-flops 128a, 128b, 128c, 128d, 128e, 128f, 128g, 128h (collectively referred to herein as "clock domain flops 128") and a clock domain toggle flip-flop 124. Hereinafter, "strobe domain" refers to the clock associated with the link bus strobes L_STB, L_STB_N, whereas "clock domain" refers to the less stringent core logic clock domain of the receiving component.

The first toggle flop 122a is clocked by the first additional strobe STBA, the second toggle flop 122b is clocked by the second additional strobe STBB, the third toggle flop 122c is clocked by the third additional strobe STBC, and the fourth toggle flop 122d is clocked by the fourth additional strobe STBD. All of the toggle flops 122 have their respective inverting output $\overline{Q}$ connected to their respective input data terminal D. This way, on every clock cycle of their respective strobe STBA, STBB, STBC, STBD, the output of the toggle flops 122 non-inverting output Q will toggle between logic 1 and 0 values.

The toggle flops 122 are in the strobe domain since they are essentially driven by the two strobes L_STB, L_STB_N of the link bus. The clock domain toggle flip-flop 124, on the other hand, is driven by the clock signal CLK driving the core logic of the receiving/target device. The clock domain toggle flip-flop 124 has its inverting output $\overline{Q}$ connected to its input data terminal D. This way, on every clock cycle of the core logic clock signal CLK, the output of the non-inverting output Q will toggle between logic 1 and 0 values. As noted earlier, the clock signal CLK has a slower rate than the strobes of the link bus. The core logic clock domain has substantially less stringent timing requirements than the source strobe clock domain and, as will be discussed below, will be used to determine when a new source strobe event has occurred.

The non-inverting output Q of the first toggle flip-flop 122a is input into the enable EN inputs of the first and second strobe domain flip-flops 126a, 126b. The non-inverting output Q of the second toggle flip-flop 122b is input into the enable EN inputs of the third and fourth strobe domain flip-flops 126c, 126d. The non-inverting output Q of the third toggle flip-flop 122c is input into the enable EN inputs of the fifth and sixth strobe domain flip-flops 126e, 126f. The non-inverting output Q of the fourth toggle flip-flop 122d is input into the enable EN inputs of the seventh and eighth strobe domain flip-flops 126g, 126h.

All of the strobe domain flops 126 have their data inputs D connected to receive L_CAD(i), where "i" represents a single bit of the L_CAD packet received from the link bus. In FIG. 2 eight receive data macros 102 are illustrated with each macro 102 being connected to a specified bit of the link bus (e.g., macro 102a is connected to L_CAD(0), 102b connected to L_CAD(1), etc.). Thus, if the macro 102 illustrated in FIG. 4 where macro 102a, then "i" would be 0 and the illustrated macro 102 would process bit 0 from up to eight L_CAD packets (since there are eight strobe domain flops 126).

The first and second strobe domain flip-flops 126a, 126b are clocked by the first additional strobe STBA. The third and fourth strobe domain flip-flops 126c, 126d are clocked by the second additional strobe STBB. The fifth and sixth strobe domain flip-flops 126e, 126f are clocked by the third additional strobe STBC. The seventh and eighth strobe domain flip-flops 126g, 126h are clocked by the fourth additional strobe STBD.

The output Q of the first strobe domain flip-flop 126a is input into the data D input of the first clock domain flip-flop 128a. The output Q of the second strobe domain flip-flop 126b is input into the data D input of the second clock domain flip-flop 128b. The output Q of the third strobe domain flip-flop 126c is input into the data D input of the third clock domain flip-flop 128c. The output Q of the fourth strobe domain flip-flop 126d is input into the data D input of the fourth clock domain flip-flop 128d. The output Q of the fifth strobe domain flip-flop 126e is input into the data D input of the fifth clock domain flip-flop 128e. The output Q of the sixth strobe domain flip-flop 126f is input into the data D input of the sixth clock domain flip-flop 128f The output Q of the seventh strobe domain flip-flop 126g is input into the data D input of the seventh clock domain flip-flop 128g. The output Q of the eight strobe domain flip-flop 126h is input into the data D input of the eighth clock domain flip-flop 128h.

The eight clock domain flops 128 are clocked by the core logic clock signal CLK. The non-inverting output Q of the clock domain toggle flip-flop 124 is input into the enable EN inputs of the first, third, fifth and seventh clock domain flops 128a, 128c, 128e, 128g. The inverting output $\overline{Q}$ of the clock domain toggle flip-flop 124 is input into the enable EN inputs of the second, fourth, sixth and eighth clock domain flops 128b, 128d, 128f, 128h.

With the illustrated configuration, the output Q of the first clock domain flip-flop 128a yields core logic command/address/data (CAD) bit "i" for CAD(0), which is represented as CAD_i(0). The output Q of the second clock domain flip-flop 128b is CAD_i(4), third clock domain flip-flop 128c is CAD_i(1), fourth clock domain flip-flop 128d is CAD_i(5), fifth clock domain flip-flop 128e is CAD_i(2), sixth clock domain flip-flop 128f is CAD_i(6), seventh clock domain flip-flop 128g is CAD_i(3), and the eighth clock domain flip-flop 128h is CAD_i(7). Thus, a command/address/data bit L_CAD(i) received from the link bus is shifted from the strobe domain (i.e., L_STB, L_STB_N) into the core logic clock domain (e.g., CLK) with a simple arrangement of flip-flops. As will be discussed below, the macro 102 is designed to continuously latch the strobe domain data L_CAD(i) (from the strobe domain flops 126) into the core logic clock domain (via the clock domain flops 128). This capability allows the invention to implement the following source strobe event detection methods.

Figure 10:
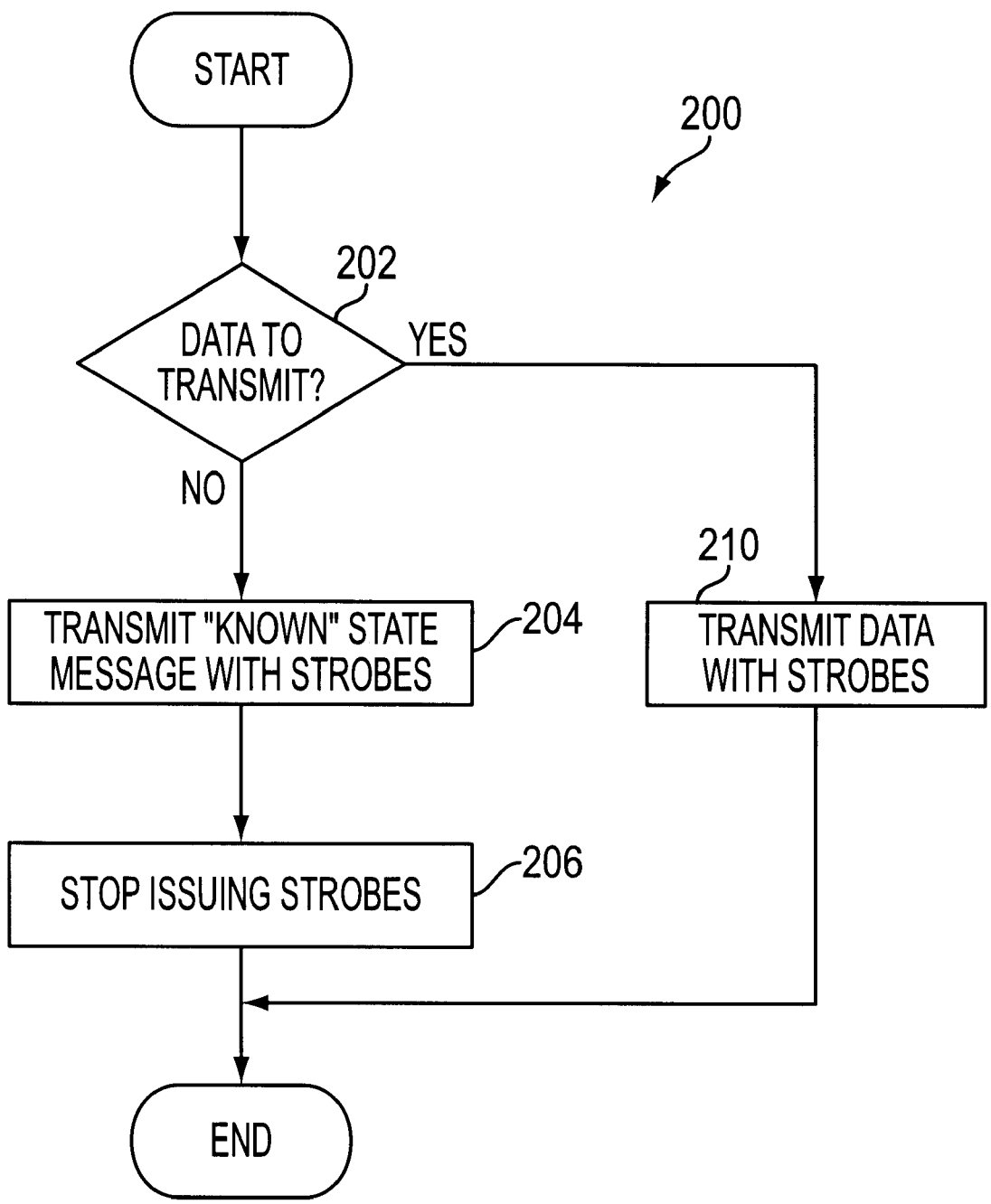
FIGS. 10 and 11 are exemplary source strobe event detection methods used in the system illustrated in FIG. 1.
Figure 11:
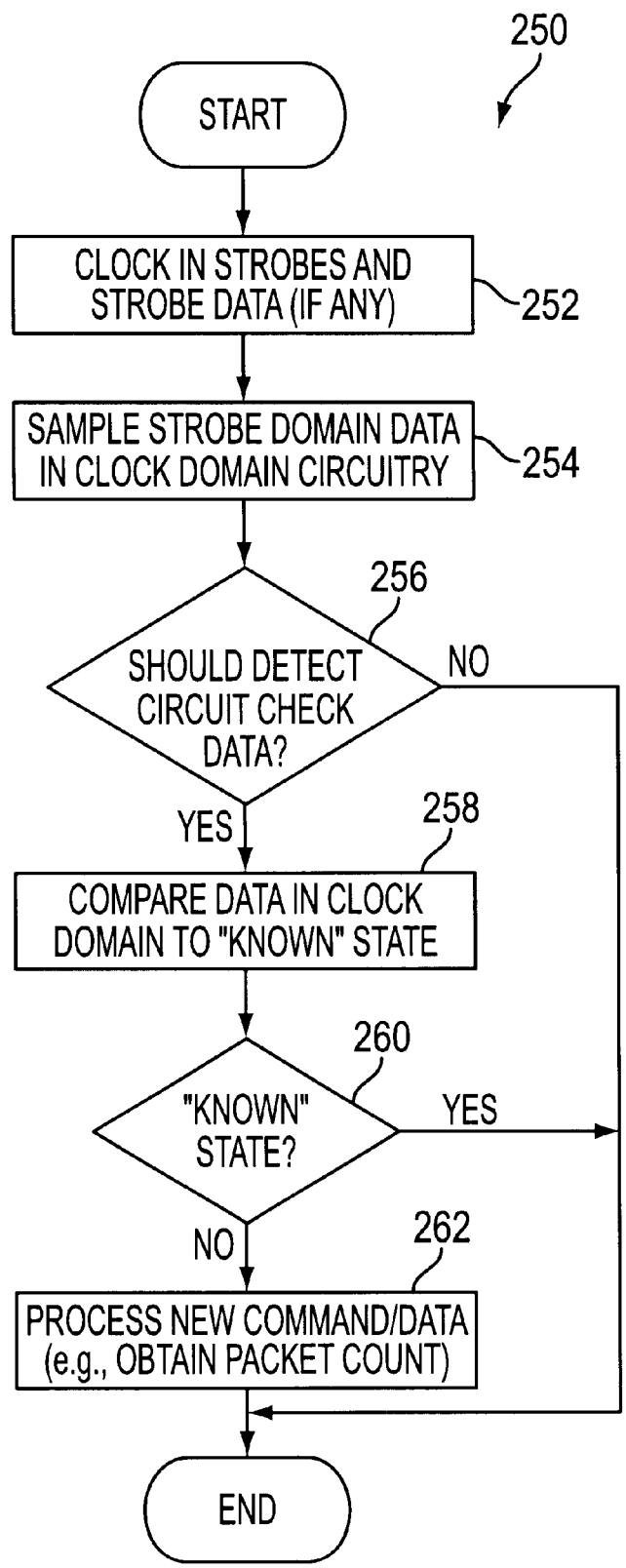

FIGS. 10 and 11 are exemplary source strobe event detection methods 200, 250 used in the system 10 illustrated in FIG. 1. The methods 200, 250 are implemented through the use of respective link buses between each satellite device and the link hub, the link bus protocol described in detail below, and the receiving circuitry 100 (illustrated in FIGS. 2–5).

Referring now to FIG. 10 the method 200 that is performed by the transmitting device connected to the link bus is now described. The method 200 begins when the transmitting device determines whether there is data to transmit over the link bus (step 202). If it is determined that there is data to transmit, the method 200 continues at step 210, where the transmitting device transmits data over the link bus. When the transmitting device transmits this data, it will also issue the two link bus clock strobes L_STB, L_STB_N to signify to the target device that data is being transmitted. The data transfer is typically initiated with a command packet that describes at least the type and size of the transfer. The command packet allows the target to prepare for the transfer. The protocol and message formats for a typical data transfer are described below with respect to FIGS. 6–9 and Tables I–IX.

If it is determined at step 202 that there is no data to transmit at this time, the method 200 continues at step 204. At step 204, the transmitting device sends a command packet to the target device that is intended to place the target and the link bus into a "known" state. One exemplary known state is an idle state IDLE, which indicates that the transmitting device is no longer transmitting information on the link bus. Thus, when the transmitting device determines that there is no data to transmit over the link bus, the device will build a command packet having a command field indicative of the idle state IDLE. This idle state IDLE will also be referred to as parking the link bus.

When the transmitting device transmits the known state command message, it will also issue the two link bus clock strobes L_STB, L_STB_N to signify to the target device that data is being transmitted. At step 206 the transmitting device stops issuing the two link bus clock strobes L_STB, L_STB_N. This will keep the receiving circuitry 100 (FIG. 2) of the target from clocking in data from the L_CAD portion of the link bus while the link bus is IDLE or parked.

Referring now to FIG. 11 the method 250 that is performed by the target device connected to the link bus is now described. The method 250 begins when the receiving circuitry 100 (FIG. 2) clocks in the link bus strobes L_STB, L_STB_N and the strobe domain data L_CAD, if there are strobes L_STB, L_STB_N and strobe domain data L_CAD to input (step 252). If the bus is parked (i.e., the bus is idle after the transmitting device issues the idle command) then step 252 does not occur. At step 254 the strobe domain data that is latched in the strobe domain flops 126 (FIG. 4) is sampled into the clock domain flops 128 (FIG. 4). As noted earlier, even if there are no link bus strobes L_STB, L_STB_N, the clock domain flops 128 (FIG. 4) are capable of latching the latched strobe domain data into the clock domain. If the last strobe domain data L_CAD received was the IDLE command packet, then the latched data will be the IDLE command packet data.

At step 256, the method 250 continues by determining whether change detect circuitry should check the data latched in the clock domain to see if a new source strobe event has occurred. Since the transmitting device issues a command packet identifying the size of a transfer, and the methods 200, 250 of the invention are only seeking to detect a new source strobe event, there is no reason to check the latched data until the prior source strobe event has completed. For example, if the transmitting device issues a command packet identifying a data transfer of N packets, then a new event cannot be received until after the N packets have been received. Thus, the receiving circuitry does not have to check for a new event until packet N+1 is received (or expected to be received). Thus, at step 256 the method checks a packet count or other indicator to determine if the latched data should be checked.

If at step 256 it is determined that the change detect circuitry should check the data latched in the clock domain to see if a new source strobe event has occurred, then the method 250 continues at step 258. At step 258 change detect circuitry compares data latched in the clock domain to the known state. If, for example, the idle state IDLE is being used as the known state, then the change detect circuitry compares the latched data to the IDLE command. At step 260 it is determined whether the clock domain data is set to the known state. If the clock domain data is in the known state (e.g., IDLE), then no new source strobe event has been detected and the method 250 completes.

If at step 260 it is determined that the clock domain data is not in the known state, then the method 250 continues at step 262, where a new command/address/data from the link bus is processed because a new source strobe event has been detected by the change detect circuit. At this step, information about the new event is obtained, such as a packet count, to aid in the detection of the next source strobe event (i.e., information need for step 256).

Figure 5:
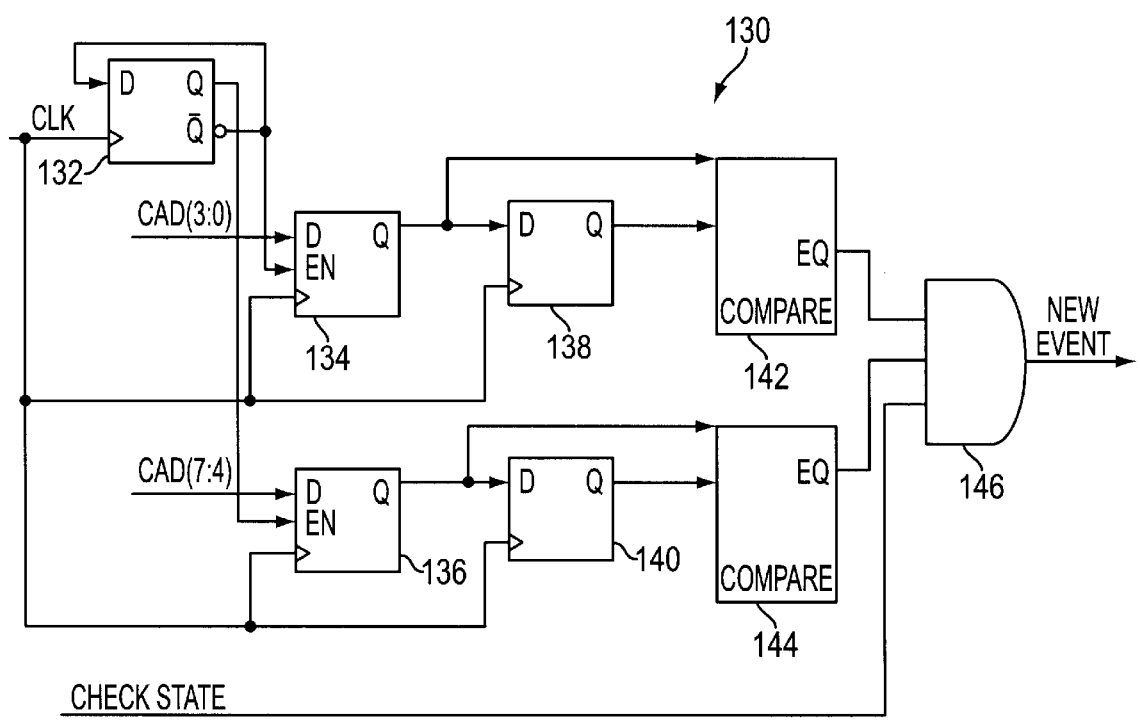
FIG. 5 is an exemplary change detection circuit used in the system illustrated in FIG. 1.

FIG. 5 is an exemplary change detection circuit 130 used in the system 10 (illustrated in FIG. 1) to execute steps 258 and 260 of the method 250 (FIG. 11). The change detection circuit 130 includes a clock domain toggle flip-flop 132, two clock domain data flip-flops 134, 136, two clock domain latches 138, 140, two compare circuits 142, 144 and an AND gate 146. It should be appreciated that this is only an exemplary embodiment for the change detection circuit 130 and that the invention is not limited to any specific circuitry.

The clock domain toggle flip-flop 132 is driven by the core logic clock signal CLK. The clock domain toggle flip-flop 132 has its inverting output $\overline{Q}$ connected to its input data terminal D. This way, on every clock cycle of the clock signal CLK, the output of the non-inverting output Q will toggle between logic 1 and 0 values. The output of the non-inverting output Q is used to enable the two clock domain data flip-flops 134, 136.

The two clock domain data flip-flops 134, 136 are clocked by the core logic clock signal CLK. The first clock domain data flip-flop 134 inputs all of the data bits from CAD(3:0) from the data macros 102 (FIG. 2). In an exemplary embodiment, this is at least 32-bits of data (8-bits each from CAD(3), CAD(2), etc.). The second clock domain data flip-flop 136 inputs all of the data bits from CAD(7:4) from the data macros 102 (FIG. 2). In an exemplary embodiment, this is at least 32-bits of data (8-bits each from CAD(7), CAD(6), etc.). It should be noted that if a 16-bit command/address/data bus is used, then the change detection circuitry would be include additional circuitry to input CAD(15:8).

The output Q of the first clock domain data flip-flop 134 is input into the data input D of the first latch 138 and the first compare circuit 142. The output Q of the second clock domain data flip-flop 136 is input into the data input D of the second latch 140 and the second compare circuit 144. The first and second latches 138, 140 are clocked by the core logic clock signal CLK. The first latch 138 is used to latch and output the output Q from the first clock domain flip-flop 134. Similarly, the second latch 140 is used to latch and output the output Q from the second clock domain flip-flop 136.

The first compare circuit 142 inputs an output Q from the first clock domain flip-flop 134 and the first latch 138 and the second compare circuit 144 inputs an output Q from the second clock domain flip-flop 136 and the second latch 140. In operation, the compare circuits 142, 144 compare their respective inputs (i.e., the current CAD information from the clock domain flip-flops 134, lo 136 and the prior CAD information from the latches 138, 140) to see if they are equal. If the respective inputs are equal, the compare circuits 142, 144 output a first signal from their respective equal output EQ. If the respective inputs are not equal, the compare circuits 142, 144 output a second different signal from their respective equal output EQ. For example, a logic "1" could be output when the compare circuits 142, 144 detect that their respective inputs are equal and a logic "0" could be output when the compare circuits 142, 144 detect that their respective inputs are not equal.

The outputs of the first and second compare circuits are input into the AND gate 146. The third input of the AND gate 146 is connected to a CHECK STATE signal representing when it is time to check for a new event. As noted above with respect to step 256 of method 250 (FIG. 11), it may be desirable to check for a new event only after the last event has completed. Thus, the CHECK STATE signal will be generated by the core logic only when it is possible for a new event to occur. In an exemplary embodiment, the CHECK STATE signal will be generated with a logic "1" value when it is time to check for a new event and will not be generated (or driven to a logic "0" value) when it is not time to check for a new event.

In one exemplary embodiment, the known state is the bus idle state IDLE and thus, the CHECK STATE signal is indicative of when it is time to check for the idle state IDLE. It should be noted that the compare circuits 142, 144 should be designed such that if their respective inputs are equal, then the value of their respective outputs EQ should equal the value of the CHECK STATE signal used to indicate that it is time to check for a new event.

The output of the AND gate 146 is a new event signal NEW EVENT. If the circuitry 130 detects a new event, then the new event signal NEW EVENT will have a first logic level (e.g., logic "1"). If the circuitry 130 does not detect a new event, then the new event signal NEW EVENT will have a second logic level (e.g., logic "0"). In operation, the AND gate 146 will always output a new event signal NEW EVENT indicating that a new event has not been detected when the CHECK STATE signal indicates that it is not time to check for a new source strobe event.

When the CHECK STATE signal indicates that it is time to check for a new source strobe event, then the outputs from the two compare circuits 142, 144 will determine if a new event has occurred. That is, if the respective outputs of the two compare circuits 142, 144 indicate that their respective inputs are equal, then the NEW EVENT output of the AND gate 146 will be a value indicative of the known state, which means that a new event has not occurred (e.g., the bus is in the idle state IDLE). If the respective outputs of either or both of the two compare circuits 142, 144 indicate that their respective inputs are not equal, then the NEW EVENT output of the AND gate 146 will be a value indicative of a state other than the known state, which means that a new event has occurred (e.g., the bus is not in the idle state IDLE). As noted above, this detection of the new event or the known state is made in the core logic clock domain.

Thus, the invention allows source strobe events (e.g., command and data transfers) to be detected in the core logic clock domain, which is less stringent than the source strobe domain of the link bus. Moreover, the invention allows the detection of the new events without unnecessary loading the source strobes L_STB, L_STB_N and without routing the strobes L_STB, L_STB_N externally from the macros of the receiving circuitry. By detecting source strobe events in this manner, a hub based computer system using the invention can substantially control and minimize any skew and asymmetry of the source strobed link bus. This allows for higher data rates and also improves the overall performance of the system.

Referring to FIGS. 6–9, an exemplary link bus and link bus protocol are now described. It should be noted that memory transfers will most likely make up the majority of the transfers across the link bus. Burst operations form the vast majority of transfers from the satellite devices as I/O devices, but partial reads/writes shall also be supported. It is desirable for burst transfers to be aligned on 64-byte boundaries. If a PCI-X device communicates over the link bus, the device will indicate it's intention to transfer up to 4K bytes and if PCI devices are used, PCI pre-fetching can also support bursts greater than 64-bytes. Thus, it is desirable for the link bus to include a mechanism to request 4K bytes of data per request. Partial transfers will transfer less than the minimum burst size. These transfers are primarily partial writes with byte enables. Byte enables must then be encoded in the link bus request phase.

In an exemplary implementation of the link bus protocol, each satellite device will appear to software as a bridge of some sort. This allows a simple address decode model for each of the satellite devices. For example, in systems including PCI buses, each satellite device will report as a PCI-PCI bridge and in systems using PCI-X buses, each satellite device will report as a PCI-X-PCI-X bridge. In these example systems, only the south bridge, which may itself be a satellite device, will report as a different device. The PCI bridge model works well to decode transfers from the satellite device going upstream to the link hub. The link hub will, by necessity, need to know the addresses mapped in each of the satellite devices in order to move transfers downstream, and in a lateral direction (peer to peer transfers).

In PCI systems, for example, PCI configuration address space is used to allocate memory resources, as well as other configuration attributes, in the system. Registers within the PCI configuration space are used to define memory and I/O address spaces. This configuration information is used to decide addresses of transfers going both upstream and downstream from the link hub. Addresses that are going downstream must fall within a programmed address range while addresses going upstream must fall outside a programmed address range. Due to the hub based architecture of the system, configuration information must exist in the upstream device (e.g., link hub) and the downstream device (e.g., satellite device). This means that the function of a PCI-PCI bridge, for example, is performed by two independently operating devices—one device initiating downstream transfers and one device initiating upstream transfers.

Thus, the same configuration information must exist in both the satellite device and the link hub. One method of distributing configuration information in a hub based architecture is described in co-pending application Ser. No. 09/730,608, entitled "Link Bus for a Hub Based Computer Architecture," which is hereby incorporated by reference in its entirety.

As noted above, once the link hub and the various devices are configured, data transfers can be made throughout the system. Because some of today's (and fiture) industry standard buses support split transactions, it is desirable for the link bus protocol to support split transactions as well. For example, the PCI-X standard supports split-transactions to free up the bus. A split-transaction request is issued, and some time later the target of the original request issues a split completion. This is similar to the deferred request of some processor families, which would then be responded to by the target using a defer reply. The split-transaction mechanism is an elegant way to free up the bus for other transactions while a target is kept busy performing the transaction request. The link bus protocol also utilizes the split-transaction mechanism.

Some additional industry standard rules shall also be observed by the link bus protocol. For example, PCI-X includes a status bit that indicates the transfer can use relaxed ordering rules. This will speed up transfers by eliminating buffer flushing along the data path. It is desirable that the link bus protocol include relaxed order status. In addition, PCI-X includes a status bit that indicates the transfer does not need to perform a snoop operation on the processor caches. In a cached system, snooping is performed to find any modified data in the caches. That is, find the freshest data in the caches. Snooping is a method used to ensure the coherency of memory in a system employing memory caches. Transfers of this type may proceed directly to memory without snooping the processor caches. It is desirable that the link bus protocol include a "no snooping" option as well.

In a preferred embodiment, the link bus consists of an 8-bit or a 16-bit command/address/data bus (L_CAD) and the two source strobed clock signals L_STB, L_STB_N as shown below in Table I. A single status signal L_ST is used to exchange flow control information between devices. Optionally, byte enables may be issued coincident with each data phase. Exemplary formats for the L_CAD, L_STB, L_STB_N and L_ST signals will be described below in more detail.

TABLE I

| Signal | Type | Count | Description |
| --- | --- | --- | --- |
| L_CAD[15:0] | In/Out | 16 | Link bus command/address/data |
| L_CAD[17:16] | In/Out | 2 | Optional byte enables for write data. Not needed for all link bus configurations. |
| L_STB | In/Out | 1 | Link bus strobe |
| L_STB_N | In/Out | 1 | Link bus strobe Not |
| L_ST | In/Out | 1 | Link bus status |

Figure 6:
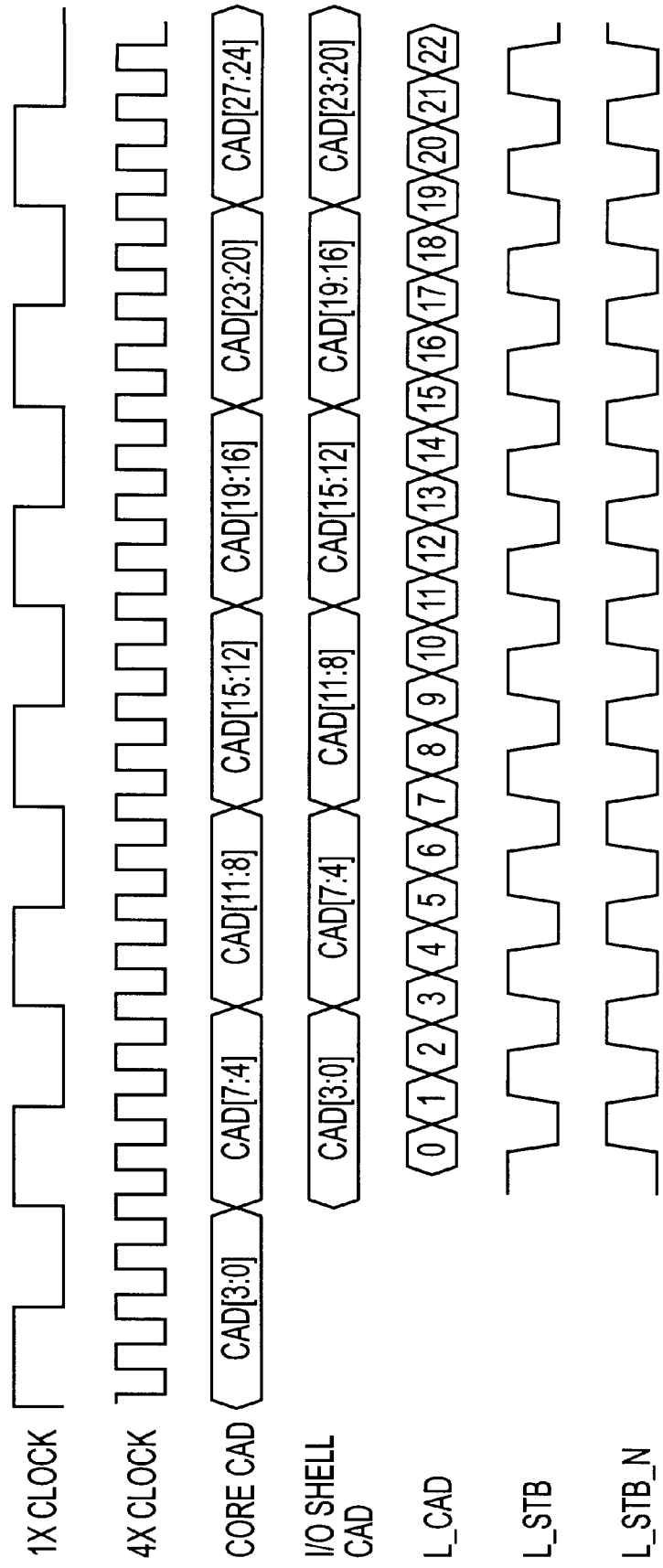
FIGS. 6–8 are timing diagrams illustrating the timing of the transmit and receipt of command/address/data in accordance with an exemplary protocol of the invention.

FIG. 6 is an exemplary diagram illustrating the timing of the transferring of command/address/data onto the link bus by one of the satellite devices (or link hub). In one embodiment of the link bus, the system clock will be distributed internally by a phase-locked loop (PLL) capable of generating both a "1X" clock (i.e., data transferred one-time per clock tick) and "4X" clock (i.e., data transferred four-times per clock tick). FIG. 6 illustrates the 1X and 4X clock signals, command/address/data ("CAD") from the core logic of the device, CAD latched in an I/O shell and the link bus signals L_CAD, L_STB and L_STB_N.

In the transmit waveform of the link bus, CAD is issued from the core logic on the device in the 1X clock domain and captured in an I/O macro (i.e., I/O shell) in the 1X clock domain. Once in the I/O macro, the CAD is multiplexed from the 1X clock domain to the 4X clock domain. Once in the 4X domain, the CAD is driven onto the link bus as the L_CAD signals. The source strobed clock signals L_STB, L_STB_N are also driven onto the link bus to generate strobes at two-times the system clock frequency. The source strobed clock signals L_STB, L_STB_N are driven at two-times the system clock frequency so the receiver only has to work with one edge of each strobe L_STB, L_STB_ N, eliminating concerns about strobe asymmetry.

In an exemplary embodiment, two strobe signals L_STB, L_STB_N are operating at twice the clock frequency, providing a total of four strobe events for each clock cycle. In the exemplary embodiment, the link bus protocol will not allow fewer than four strobes per clock cycle. 64-bits of data may therefore be transferred every clock cycle in a 16-bit link bus configuration. Similarly, in a 8-bit link bus configuration, 32-bits of data may be transferred per clock cycle. It is also desirable for data to be transferred along 8-byte address boundaries. Thus, a 16-bit link bus configuration may transfer 8-bytes in one clock cycle, while the 8-bit link bus transfers data in two clocks cycles.

Figure 7:
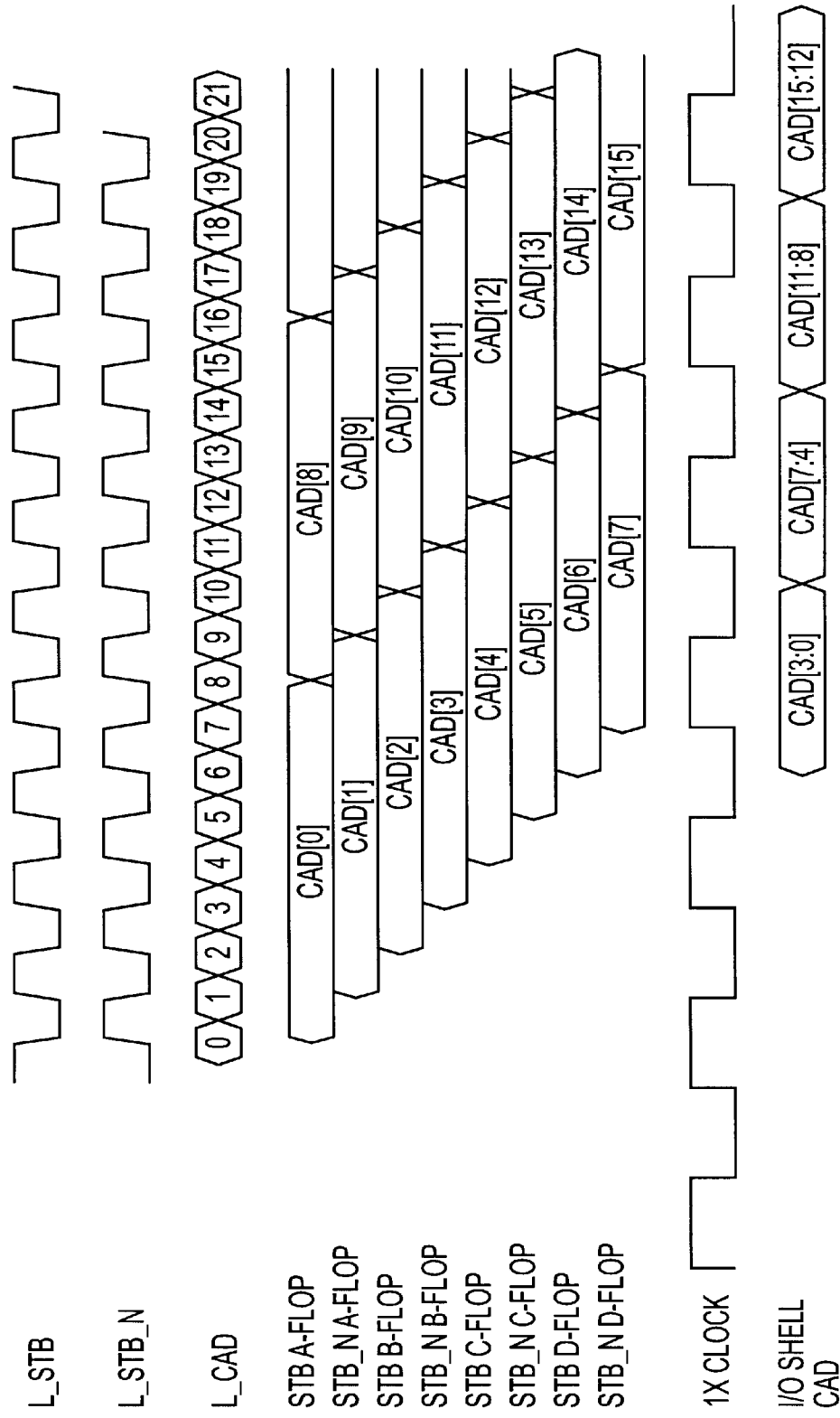

Once the signals are transmitted onto the link bus, another device (i.e., the target) may receive the signals in accordance with the link bus protocol. Referring now to FIG. 7, the timing of the receipt of the link bus command/address/data L_CAD and source strobed clock signals L_STB, L_STB_N is now described. The target device will receive the L_CAD and strobes L_STB, L_STB_N after some delay. The received information should then be synchronized back into the 1X clock domain. As described above, for each strobe of the source strobed clock signals L_STB, L_STB_N, there are a series of latches or flip-flops in the receiver I/O macro (identified in FIG. 7 as A, D, C, and D flip-flops). L_CAD information is clocked into each flip-flop as CAD information in a ping-pong fashion so that timing may be met. The CAD is then transmitted to the 1X clock domain in the I/O macro by assembling each of the data in the A, B, C, D flops into a wider data path in accordance with rules that will meet timing requirements between the strobe domain and the 1X clock domain. Once in the 1X clock domain, the CAD is available to the receiver's core logic.

Figure 8:
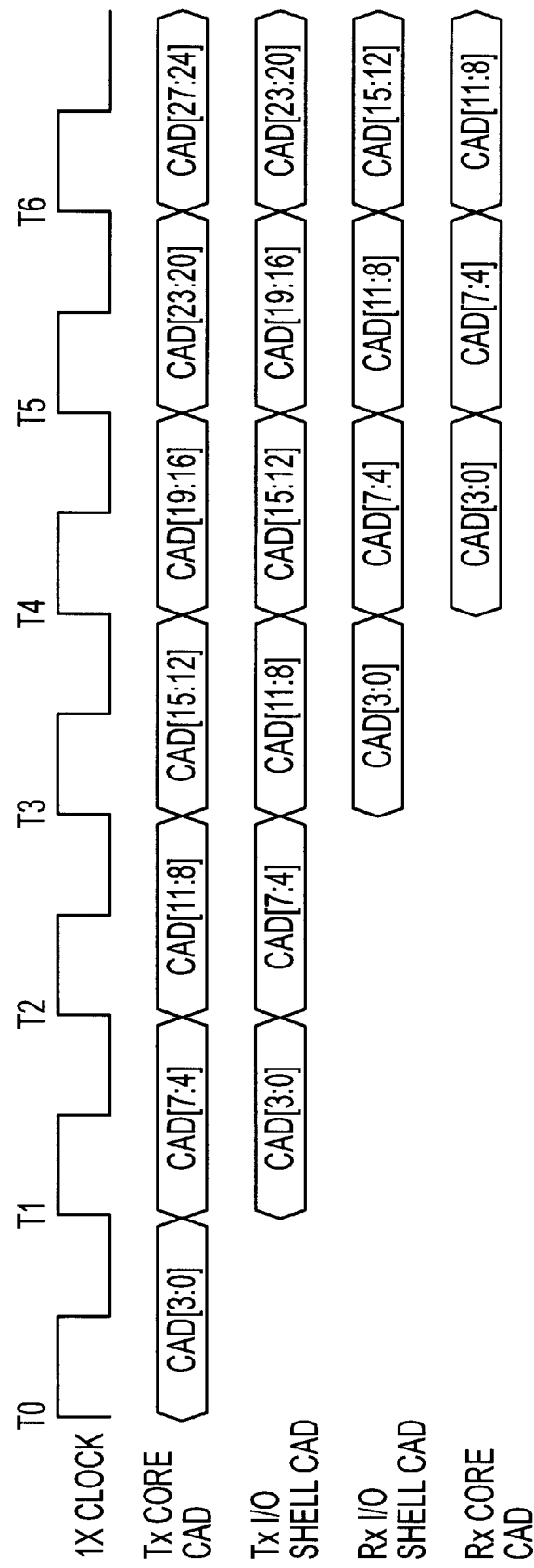

FIG. 8 shows a generalized view of the transfer of command/address/data from the time that it is available in the core logic of the transmitting device, to the time that it is available to the core logic of the receiving device. This generalized view does not show the intermediate steps of quad pumping across the link bus. For the purpose of illustration, it is assumed that CAD is quad pumped as illustrated in FIGS. 6 and 7. It should be noted that it takes five clock cycles from the time a state decision is made in the transmitter core (time T0), to the time the receiver core can act on that information (time T4).

Figure 9:
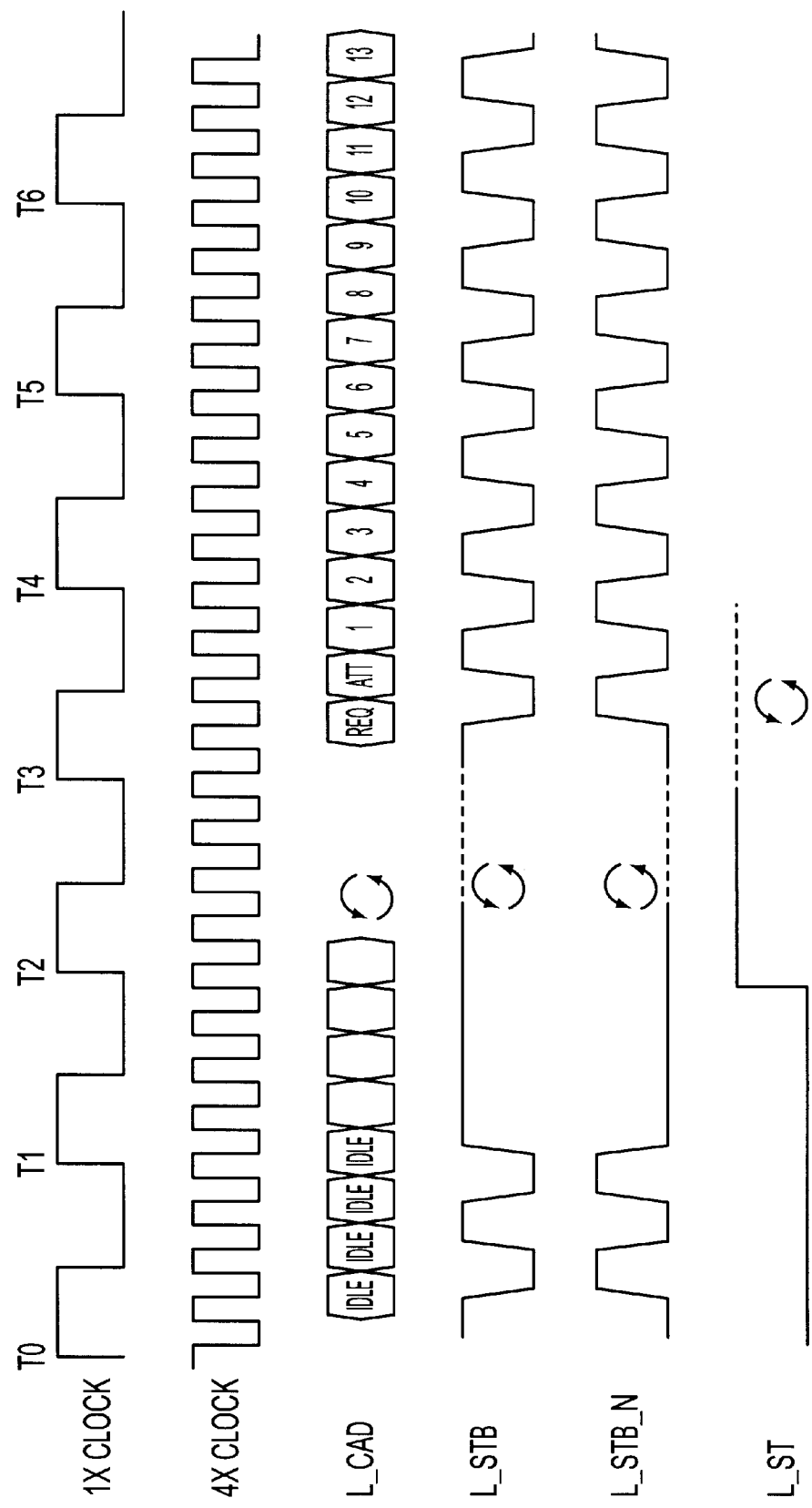
FIG. 9 is a timing diagram illustrating the timing of placing the link bus and receiving circuitry in to and out of the known state in accordance with the invention.

FIG. 9 is a timing diagram illustrating the timing of placing the link bus and the receiving circuitry in to and out of the known state in accordance with the methods 200, 250 (FIGS. 10–11) of the invention. At time T0 the transmitting device issues a command to place the link bus in to the known state. In this illustrated embodiment, the known state is the idle state IDLE. Thus, the transmitting device issues an IDLE command packet on the link bus.

After issuing the IDLE command, the transmitting device stops issuing the source strobes L_STB, L_STB_N (times T1 and T2). The target clocks in the last packet of L_CAD information and continuously samples the L_CAD into the core logic clock domain (e.g., the "1X clock" in FIG. 9). At time T3 the transmitting device begins a new source strobe event by issuing a transfer request on the link bus and both source strobes L_STB, L_STB_N. The receiving circuitry of the target, which has been clocking in the L_CAD information from the last transfer prior to the IDLE command, clocks the new request into the core logic (as described above with reference to FIGS. 2–4). Once the new request is clocked into the core logic clock domain flip-flops of the target, the change detect circuit determines that there is a new source strobe event, which is subsequently processed in the core logic.

It should be appreciated that the above described timing diagrams are mere illustrations of exemplary embodiments of the link bus and link bus protocols and that the invention is not limited to any specific timing.

It is desirable for data to be paced only on certain naturally aligned data boundaries (ADB's). An ADB is an amount of data that may be transferred across the link bus in a certain number of clock cycles. In one embodiment, the ADB is the amount of data that may be transferred across the link bus in eight clock cycles. Examples of ADBs would include 64-bytes for a 16-bit link bus and 32-bytes for an 8-bit link bus. The pacing of information on the link bus is described in co-pending application Ser. No. 09/730,774, entitled "Method of Pacing and Disconnecting Transfers on a Source Strobed Bus," which is hereby incorporated by reference in its entirety.

As noted above, in addition to the clock forwarded quad-pumped command/address/data portion of the link bus, there is a single-bit link status signal L_ST. The link status signal L_ST time multiplexes arbitration and data flow information. For every transaction, one device connected to the link bus will serve as a bus master and the other device will serve as the bus slave. Data may be stalled by either the master, or the slave by defining certain windows during a transfer in which the status may be driven and observed. In a typical situation, the transferring device serves as the master, while the receiving device (i.e., the target) serves as the slave. The target may request its desire to become the link master by time multiplexing an arbitration request on the status signal L_ST.

Each device connected to a particular the link bus is given the opportunity to arbitrate for the link bus. Typically, when a source strobed bus is used, one device (e.g., memory controller) always serves as the bus master, while the other device (e.g., memory device) always serves as the bus slave. In the present invention, however, either device can serve as the master. In one exemplary embodiment of the invention, the link bus follows a round-robin arbitration method. Due to the split-transaction nature of the link bus, both devices must have a fair opportunity to access the link bus to prevent deadlocks. There is no central arbitration point which decides who is granted the bus. Instead, the arbitration is decentralized with each device observing certain state information to decide which of the devices is the bus master. A device that is not currently the bus master (i.e., the target) may request to become a bus master by time multiplexing an arbitration request on the link status signal L_ST. The arbitration protocol allows bus parking, and back-to-back transfers to minimize latencies and improve performance. The arbitration of the bus is distributed between the two Link entities, as is described in co-pending application Ser. No. 09/730,780, entitled "Arbitration Method for a Source Strobed Bus," which is hereby incorporated by reference in its entirety.

Now that the basic functions and timing of an exemplary link bus and link bus protocol have been described, the following now describes the format and content of the information packets transmitted over the link bus. One packet of information is the command packet. A command packet is issued by the current link bus master and may include information such as command, address, transfer count, as well as other attributes needed in the system. An exemplary command packet format is illustrated below in Table II. It should be noted that the formatting illustrated in Table II (and Tables III–IX) are examples of the type of format/content that may be used to implement the link bus and link bus protocol. Specific bit fields or sizes of the fields are not given in the Tables because the invention is not limited to any specific field size or position (i.e., bit position) within the packet.

TABLE II

| Field | Description |
| --- | --- |
| Command | Bus Command |
| Address | During memory transactions this field represents a portion of the address. |
| Count/Enable | During block transfers, this field represents the number bytes to transfer. During partial transfers this field represents byte enables. |
| Command attribute | The command attribute field is defined differently for split completion commands and all other commands. For split completion commands this field indicates the completion status of an earlier requested transfer. For all other commands the field indicates transfer attributes of the current request. |

As can be seen from Table II, an exemplary command packet may include command, address, transfer count or byte enable and attribute fields. Exemplary commands that can occupy the command field are illustrated below in Table III. In an exemplary embodiment, the link bus supports split transactions. Thus, the command attribute field is defined differently for split completion commands than all other command requests. Table IV illustrates exemplary definitions for the attribute field for all normal commands, while Table V illustrates exemplary definitions for the attribute field for the split completion command.

TABLE III

| Command | Description |
| --- | --- |
| Idle | Bus Idle, no requests. All other bits are inactive to conserve power. |
| Split Completion | Split completion reply. Issued in response to a previously issued request to transfer read data, or transfer completion status. |
| Message Read | Message read request such as processor interrupt acknowledge, flush, fence. |
| Message Write | Message write request such as processor special cycles, NOP, interrupt messaging, and error status messaging. |
| Block Memory Read | Request a memory read of e.g., 1 to 4K bytes. Large block memory reads are the preferred transfer method. |
| Block Memory Write | Request a memory write of e.g., 1 to 4K bytes. Byte enables for all requested bytes are assumed active. Large block memory writes are the preferred transfer method |
| Partial Memory Read | Request a memory read of bytes less than the minimum burst size read. |
| Partial Memory Write | Request a memory write of bytes less than the minimum burst size write. |
| Configuration Read | Read Configuration data. Address is encoded similar to PCI Type 1 configuration cycles. The Link target must decode to determine if transfer is target internally or to subordinate bus. |
| Configuration Write | Write Configuration data. Address is encoded similar to PCI Type 1 configuration cycles. The Link target must decode to determine if transfer is target internally or to subordinate bus. |
| I/O Read | I/O read data. |
| I/O Write | I/O write data. |
| Reserved | Reserved Commands. |

TABLE IV

| Field | Description |
| --- | --- |
| Relaxed Ordering Rules | Indicates that the target may use relaxed ordering rules to transfer data. |

TABLE IV-continued

| Field | Description |
| --- | --- |
| No Snoop | Indicates that memory accesses do not need to be snooped. Not valid for non-memory transfers. |
| No Split-Completion | Indicates that no split-completion message is expected by the master. For writes, this indicates that the transfer is posted, and the master assumes the target shall perform the steps necessary to complete it on the subordinate bus. |
| Lock | Indicates the status of bus lock issued by the processor. Only valid during processor initiated transfers. Note this does not lock the link bus, only the target bus subordinate to the link bus. |

TABLE V

| Field | Description |
| --- | --- |
| Retry | Indicates that the target has retried the transaction. |
| Request Complete | Indicates that the read/write request has completed normally. |
| RD/WR | Indicates that the split completion is issued in response to a read or write request. |
| No Data | Indicates that no data is transferred, and the value of the Count/Enable field is invalid. |
| Split Completion Error | Indicates that an error occurred during the split completion. |
| Split Completion Error Status | Indicates the type of completion error as defined in e.g., PCI-X. |

The address field identifies the address of the target request. The address field is slightly different for each of the commands. Table VI illustrates one way in which the address field may vary dependent upon the command field.

TABLE VI

| Command | Address Field Description |
| --- | --- |
| Idle | All address bits in the low power state. |
| Split Completion. | Copy of the original split-transaction tag issued with the original request. All other bits are reserved. |
| Message Read | See Table VII |
| Message Write | See Table VIII |
| Block Memory Read | Address of the memory request. |
| Block Memory Write | |
| Partial Memory Read | Address of the memory request. |
| Partial Memory Write | |
| Configuration Read | Address of Configuration address register (e.g., I/O register). |
| Configuration Write | |
| I/O Read | Address of the I/O request. |
| I/O Write | |
| Reserved | Reserved. Should be driven to the low power state |

The address field requires a more detailed definition for message read and write commands. Exemplary address fields for write commands are found in Table VII, while exemplary address fields for read commands are found in table VIII.

TABLE VII

| Command | Description |
| --- | --- |
| Shutdown Special Cycle | Processor special cycle |
| Halt Special Cycle | Processor special cycle |
| Stop Clock Grant Special Cycle | Processor special cycle |

TABLE VII-continued

| Command | Description |
| --- | --- |
| x86 architecture specific NOP | Processor special cycle No Operation. May be issued from any link device. |
| Interrupt Event | One or more interrupt lines from a satellite have changed states. |
| PERR Event | Change in PERR status. |
| SERR Event | Change in SERR status. |

TABLE VIII

| Command | Description |
| --- | --- |
| Interrupt Acknowledge | Processor interrupt acknowledge |
| Flush | Flush buffers |
| Fence | Fence buffers |

In an exemplary embodiment, a split-transaction tag is used to identify the source of a request so that it may be later replied to with a split completion request. The tag is defined to interface with similar tags used for various processors and is described in Table IX.

TABLE IX

| Field | Description |
| --- | --- |
| Agent Type | Identifies the Agent as a processor, link bus satellite, or link hub. |
| Agent Tag | Identifies a particular request of the initiating Agent. This field is large enough to carry information from the processor cluster, or a PCI-X agent |
| Agent Bus Number | The PCI Bus number of the requesting device |
| Agent Device Number | The PCI device number of the requesting device |
| Agent Function number | The PCI function number of the requesting device |

Now that the exemplary format/content of command packets have been described, the following now describes an exemplary set of rules required to adhere to the link bus protocol. As much of the control information is time multiplexed across the status signal L_ST, there are certain rules that must be observed by the link master and slave to determine when information is valid and when the information can be driven on the link bus. When a device drives the status signal L_ST low, it will always drive it high one clock before tri-stating the signal L_ST.

Another rule governs the response of the target device (i.e., receiver). For example, a response must be issued by the target 1 clock cycle after observing the transfer request in the clock domain. The response must be observed by the master 4 clocks cycles after issuing the transfer request in the clock domain. Otherwise the response will be deemed invalid. In addition, the transfer shall be terminated by the master 1 clock after observing a response retry signal. It should be noted that the link bus protocol requires other rules governing the arbitration and data stalls processes. These rules, however, are not described herein because they are described in the co-pending applications previously identified above.

As noted earlier, the present invention capitalizes on the link bus and the link bus protocol to allow satellite devices to detect source strobe events such as data transfers in a clock domain that is less stringent than the source strobe domain. Moreover, the invention allows the detection of the new events without unnecessary loading the source strobes L_STB, L_STB_N and without routing the strobes L_STB, L_STB_N externally from the macros of the receiving circuitry. By detecting source strobe events in this manner, the system of the invention can substantially control and minimize any skew and asymmetry of the source strobed link bus, which allows for higher data rates and also improves the overall performance of the system.

It should be noted that the formats, timings and other definitions describing the link bus and the link bus protocol are mere examples. The invention is not to be limited to the specific examples described herein.

While the invention has been described and illustrated with reference to exemplary embodiments, many variations can be made and equivalents substituted without departing from the spirit or scope of the invention. Accordingly, the invention is not to be understood as being limited by the foregoing description, but is only limited by the scope of the appended claims.

What is claimed as new and desired to be protected by Letters Patent of the United States is:

1. A method of detecting a source strobe event in a processor based system, the system comprising a first device coupled to a second device by a link bus, the link bus comprising at least one source strobe signal line associated with a first clock domain, said method comprising the steps of:
   inputting at one of the first and second device information associated with the source strobe event from the link bus, the information being input into first circuitry associated with the first clock domain;
   sampling the input information from the first circuitry into second circuitry associated with a second clock domain;
   determining from the sampled information whether the link bus is in a known state; and
   processing the source strobe event if it is determined that the link bus is not in the known state.

2. The method of claim 1, wherein the known state is a link bus idle state.

3. The method of claim 1, wherein the information associated with the source strobe event is a command packet transmitted over the link bus from the other one of the first and second device.

4. The method of claim 1, further comprising the step of ignoring the information if it is determined that the link bus is in the known state.

5. The method of claim 4, wherein if it is determined that the link bus is in the known state, said method further comprises:
   repeating said inputting step to said determining step until it is determined that the link bus is not in the known state.

6. The method of claim 1, wherein said determining step comprises:
   determining whether the sampled information should be presently checked; and
   if it is determined that the information should be presently checked, comparing the sampled information to information indicative of the known state.

7. The method of claim 6, wherein said step of determining whether the sampled information should be presently checked comprises:
   checking a characteristic of a prior source strobe event; and determining from the checked characteristic whether it is possible for a new source strobe event to occur at present.

8. The method of claim 7, wherein the characteristic is a packet count of the prior source strobe event.

9. The method of claim 1, wherein said inputting step comprises:
   detecting a source strobe propagating in the at least one source strobe signal line; and
   inputting the input information from a command/address/data portion of the link bus.

10. The method of claim 9, wherein said sampling step comprises:
    generating simulated source strobes based on the detected source strobe;
    latching the input information within the first circuitry using the simulated source strobes; and
    clocking the latched information into the second circuitry based on a clock signal generated in the second clock domain.

11. The method of claim 1, wherein the other one of the first and second device terminates the issuance of source strobes on the source strobe line at a completion of the source strobe event.

12. The method of claim 11, wherein the other one of the first and second device continues the issuance of source strobes on the source strobe line at a beginning of a new source strobe event.

13. A method of detecting a source strobe event in a processor based system, the system comprising a hub device coupled to a processor by a processor bus and coupled to a memory device by a memory bus, the hub device being connected to a satellite device by a link bus, the link bus comprising at least one source strobe signal line associated with a first clock domain, said method comprising the steps of:
    inputting at one of the hub device and the satellite device information associated with the source strobe event from the link bus, the information being input into first circuitry associated with the first clock domain;
    sampling the input information from the first circuitry into second circuitry associated with a second clock domain;
    determining from the sampled information whether the second circuitry is in a known state; and
    processing the source strobe event if it is determined that the second circuitry is not in the known state.

14. The method of claim 13, wherein the known state is an idle state.

15. The method of claim 13, wherein the information associated with the source strobe event is a command packet transmitted over the link bus from the other one of the hub device and satellite device.

16. The method of claim 13, further comprising the step of ignoring the information if it is determined that the second circuitry is in the known state.

17. The method of claim 16, wherein if it is determined that the second circuitry is in the known state, said method further comprises:
    repeating said inputting step to said determining step until it is determined that the second circuitry is not in the known state.

18. The method of claim 13, wherein said determining step comprises:
    determining whether the sampled information should be presently checked; and
    if it is determined that the information should be presently checked, sending a signal to change detect circuitry such that the change detect circuitry compares the sampled information to information indicative of the known state.

19. The method of claim 18, wherein said step of determining whether the sampled information should be presently checked comprises:
    checking a characteristic of a prior source strobe event; and
    determining from the checked characteristic whether it is possible for a new source strobe event to occur at present.

20. The method of claim 19, wherein the characteristic is a packet count of the prior source strobe event.

21. The method of claim 13, wherein said inputting step comprises:
    detecting a source strobe propagating in the at least one source strobe signal line; and
    inputting the input information from a command/address/data portion of the link bus.

22. The method of claim 21, wherein said sampling step comprises:
    generating simulated source strobes based on the detected source strobe;
    latching the input information within the first circuitry using the simulated source strobes; and
    clocking the latched information into the second circuitry based on a clock signal generated in the second clock domain.

23. The method of claim 13, wherein the other one of the hub device and the satellite device terminates the issuance of source strobes on the source strobe line at a completion of the source strobe event.

24. The method of claim 23, wherein the other one of the hub device and the satellite device continues the issuance of source strobes on the source strobe line at a beginning of a new source strobe event.

25. A receiving circuit for detecting and receiving a source strobe event from a source strobed bus, said circuit comprising:
    a first data circuit for inputting information associated with the source strobe event from the bus, said first data circuit having a first output and being clocked by a source strobe signal associated with the bus;
    a second data circuit connected to said first output, said second data circuit having a second output and being clocked by a second clock signal associated with a clock of said receiving circuit, said second data circuit continuously sampling said first output and outputting said second output responsive to said second clock signal; and
    a change detect circuit connected to receive said second output, said change detect circuit determining whether said second data circuit is in a known state and processing the source strobe event if it is determines that said second data circuit is not in the known state.

26. The receiving circuit of claim 25, wherein the known state is a bus idle state.

27. The receiving circuit of claim 25, wherein the information associated with the source strobe event is a command packet transmitted over the bus from a master of the bus.

28. The receiving circuit of claim 25, wherein said change detect circuit ignores the information if it is determined that the second circuit is in the known state.

29. The receiving circuit of claim 25, wherein said change detect circuit determines whether said second data circuit is in a known state by determining whether said second output should be presently checked and comparing information from said second output to information indicative of the known state when it determines that said second output should be checked.

30. The receiving circuit of claim 29, wherein said change detect circuit determines whether said second output should be checked by checking a characteristic of a prior source strobe event and determining from the checked characteristic whether it is possible for a new source strobe event to occur at present.

31. The receiving circuit of claim 30, wherein the characteristic is a packet count of the prior source strobe event.

32. The receiving circuit of claim 25, wherein said first data circuit inputs the information by detecting the source strobe signal and inputting the information from a command/address/data portion of the source strobed bus.

33. The receiving circuit of claim 32, wherein said first data circuit generates simulated source strobes based on the detected source strobe and latches the input information using the simulated source strobes.

34. A receiving circuit for detecting and receiving a source strobe event from a source strobed bus, said circuit comprising:
   a source strobe macro connected to the source strobe bus, said source strobe macro receiving source strobes from the bus, generating a plurality of additional strobes based on the received strobes and outputting said additional strobes;
   a plurality of data macros connected to the source strobe bus and to the additional strobes, each of said plurality of data macros inputting information associated with the source strobe event from the bus and in response to said additional strobes, sampling the information into a clock domain associated with a core logic clock of said receiving circuit and outputting clock domain information; and
   a change detect circuit connected to receive said clock domain information and a control signal, said change detect circuit in response to said control signal determines whether the bus is a known state based on said clock domain information and processes the source strobe event when the bus is not in the known state.

35. The receiving circuit of claim 34, wherein said control signal is generated by the core logic when a new source strobe event is expected.

36. The receiving circuit of claim 34, wherein said control signal is generated by the core logic when a characteristic of a prior source strobe event indicates that a new source strobe event may occur.

37. The receiving circuit of claim 36, wherein said characteristic is a packet count of the prior source strobe event.

38. The receiving circuit of claim 34, wherein the source strobe event is a data transfer on the source strobe bus.

39. The receiving circuit of claim 34, wherein the known state is a bus idle state.

40. The receiving circuit of claim 34, wherein the information associated with the source strobe event is a command packet transmitted over the bus from a master of the bus.

41. The receiving circuit of claim 34, wherein the source strobe bus comprises a second source strobe and said receiving circuit further comprises a second strobe macro connected to receive the second source strobe, and to generate and output a plurality of second additional strobes based on the received additional strobe.

42. The receiving circuit of claim 34, wherein each data macro comprises:
   a strobe toggle circuit connected to input said additional strobes, said strobe toggle circuit generating and outputting toggle strobes to simulate the additional strobes even if said additional strobes are not received;
   a first data circuit for inputting the information associated with the source strobe event from the source strobe bus, said first data circuit having a first output and being clocked by the generated toggle strobes; and
   a second data circuit connected to said first output, said second data circuit having a second output connected to said change detect circuit and being clocked by a clock signal associated with the core logic clock, said second data circuit continuously sampling said first output and outputting said second output responsive to said clock signal.

43. The receiving circuit of claim 34, wherein said change detect circuit comprises:
   a plurality of latches, each latch receiving and latching a respective portion of said clock domain information in response to a clock signal associated with the core logic clock, each latches outputting respective latched clock domain information;
   a plurality of comparison circuits, each comparison circuit inputting a respective portion of said clock domain information and said latched clock domain information and determining whether the portions match, each comparison circuit outputting a respective comparison output signal when the portions match; and
   an AND gate connected to receive the comparison output signals and the control signal, said AND gate outputting a new source strobe event signal if the comparison output signals and the control signal indicate that a new source strobe event has occurred.

44. A processor based system comprising:
   a processor;
   a link hub coupled to said processor by a processor bus;
   a satellite device coupled to said link hub by a link bus, said link bus being a source strobed bus, at least one of said satellite device and said link hub including a receiving circuit for detecting and receiving a source strobe event from said link bus, said receiving circuit comprising:
      a first data circuit for inputting information associated with the source strobe event from said bus, said first data circuit having a first output and being clocked by a source strobe signal associated with said bus;
      a second data circuit connected to said first output, said second data circuit having a second output and being clocked by a second clock signal associated with a clock of said receiving circuit, said second data circuit continuously sampling said first output and outputting said second output responsive to said second clock signal; and
      a change detect circuit connected to receive said second output, said change detect circuit determining whether said second data circuit is in a known state and processing the source strobe event if it is determines that said second data circuit is not in the known state.

45. The system of claim 44, wherein the known state is a bus idle state.

46. The system of claim 44, wherein the information associated with the source strobe event is a command packet transmitted over the bus from a master of the bus.

47. The system of claim 44, wherein said change detect circuit ignores the information if it is determined that the second circuit is in the known state.

48. The system of claim 44, wherein said change detect circuit determines whether said second data circuit is in a known state by determining whether said second output should be presently checked and comparing information from said second output to information indicative of the known state when it determines that said second output should be checked.

49. The system of claim 48, wherein said change detect circuit determines whether said second output should be checked by checking a characteristic of a prior source strobe event and determining from the checked characteristic whether it is possible for a new source strobe event to occur at present.

50. The system of claim 49, wherein the characteristic is a packet count of the prior source strobe event.

51. The system of claim 44, wherein the other one of said link hub and said satellite device includes a receiving circuit.

52. A processor based system comprising:
   a processor;
   a link hub coupled to said processor by a processor bus;
   a satellite device coupled to said link hub by a link bus, said link bus being a source strobed bus, at least one of said satellite device and said link hub including a receiving circuit for detecting and receiving a source strobe event from said link bus, said receiving circuit comprising:
      a source strobe macro connected to said link bus, said source strobe macro receiving source strobes from said bus, generating a plurality of additional strobes based on the received strobes and outputting said additional strobes;
      a plurality of data macros connected to said link bus and to the additional strobes, each of said plurality of data macros inputting information associated with the source strobe event from said bus and in response to said additional strobes, sampling the information into a clock domain associated with a core logic clock of said receiving circuit and outputting clock domain information; and
      a change detect circuit connected to receive said clock domain information and a control signal, said change detect circuit in response to said control signal determines whether said bus is a known state based on said clock domain information and processes the source strobe event when said bus is not in the known state.

53. The system of claim 52, wherein said control signal is generated by the core logic when a new source strobe event is expected.

54. The system of claim 52, wherein said control signal is generated by the core logic when a characteristic of a prior source strobe event indicates that a new source strobe event may occur.

55. The system of claim 54, wherein said characteristic is a packet count of the prior source strobe event.

56. The system of claim 52, wherein the source strobe event is a data transfer on the source strobe bus.

57. The system of claim 52, wherein the known state is a bus idle state.

58. The system of claim 52, wherein the information associated with the source strobe event is a command packet transmitted over said bus from a master of said bus.

59. The system of claim 52, wherein said link bus comprises a second source strobe and said receiving circuit further comprises a second strobe macro connected to receive the second source strobe, and to generate and output a plurality of second additional strobes based on the received additional strobe.

60. The system of claim 52, wherein each data macro comprises:
   a strobe toggle circuit connected to input said additional strobes, said strobe toggle circuit generating and outputting toggle strobes to simulate the additional strobes even if said additional strobes are not received;
   a first data circuit for inputting the information associated with the source strobe event from the source strobe bus, said first data circuit having a first output and being clocked by the generated toggle strobes; and
   a second data circuit connected to said first output, said second data circuit having a second output connected to said change detect circuit and being clocked by a clock signal associated with the core logic clock, said second data circuit continuously sampling said first output and outputting said second output responsive to said clock signal.

61. The system of claim 52, wherein said change detect circuit comprises:
   a plurality of latches, each latch receiving and latching a respective portion of said clock domain information in response to a clock signal associated with the core logic clock, each latches outputting respective latched clock domain information;
   a plurality of comparison circuits, each comparison circuit inputting a respective portion of said clock domain information and said latched clock domain information and determining whether the portions match, each comparison circuit outputting a respective comparison output signal when the portions match; and
   an AND gate connected to receive the comparison output signals and the control signal, said AND gate outputting a new source strobe event signal if the comparison output signals and the control signal indicate that a new source strobe event has occurred.

62. The system of claim 52, wherein the other one of said link hub and said satellite device includes a receiving circuit.

* * * * *